US008845997B2

(12) United States Patent
Hammel et al.

(10) Patent No.: US 8,845,997 B2
(45) Date of Patent: Sep. 30, 2014

(54) STEAM REFORMING PROCESS WITH IMPROVED FLUE GAS FLOW

(75) Inventors: Maguelonne Hammel, Saint Maurice (FR); Guillaume Mougin, Versailles (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 137 days.

(21) Appl. No.: 12/995,603

(22) PCT Filed: Jun. 4, 2009

(86) PCT No.: PCT/FR2009/051054
§ 371 (c)(1),
(2), (4) Date: Dec. 1, 2010

(87) PCT Pub. No.: WO2010/001011
PCT Pub. Date: Jan. 7, 2010

(65) Prior Publication Data
US 2011/0084236 A1   Apr. 14, 2011

(30) Foreign Application Priority Data

Jun. 5, 2008 (FR) .................................. 08 53717

(51) Int. Cl.
*C01B 3/26* (2006.01)
*C01B 3/38* (2006.01)
*B01J 8/06* (2006.01)
(52) U.S. Cl.
CPC ........ *C01B 3/384* (2013.01); *B01J 2219/00024* (2013.01); *C01B 2203/0816* (2013.01); *C01B 2203/0233* (2013.01); *B01J 8/062* (2013.01); *B01J 2208/00221* (2013.01); *B01J 2208/00504* (2013.01)
USPC .......................................... 423/652; 422/625
(58) Field of Classification Search
USPC .......................................... 423/652; 422/625
See application file for complete search history.

(56) References Cited

U.S. PATENT DOCUMENTS

| 3,617,227 | A | | 11/1971 | Beggs |
| 4,217,948 | A | * | 8/1980 | Merzhanov et al. .......... 164/115 |
| 4,874,584 | A | * | 10/1989 | Ruottu .......................... 422/145 |
| 4,959,079 | A | | 9/1990 | Grotz et al. |
| 5,181,937 | A | | 1/1993 | Karafian et al. |
| 5,229,102 | A | * | 7/1993 | Minet et al. .................... 423/652 |
| 6,896,041 | B2 | * | 5/2005 | Lomax et al. ................. 165/135 |
| 2002/0155046 | A1 | * | 10/2002 | Platvoet et al. ............... 422/192 |
| 2007/0092436 | A1 | * | 4/2007 | Rojey et al. ................... 423/651 |

FOREIGN PATENT DOCUMENTS

| DE | 10333854 | 2/2005 |
| EP | 0047359 | 3/1982 |
| EP | 1734002 | 12/2006 |
| WO | 2006117572 | 11/2006 |

OTHER PUBLICATIONS

Search Report for PCT/FR2009/051054.

* cited by examiner

*Primary Examiner* — Paul Wartalowicz
(74) *Attorney, Agent, or Firm* — Justin K. Murray; Elwood L. Haynes

(57) ABSTRACT

A process and an installation for producing a synthesis gas by catalytic steam reforming of a charge of hydrocarbons is provided.

14 Claims, 2 Drawing Sheets

STEAM REFORMING PROCESS WITH IMPROVED FLUE GAS FLOW

This application is a §371 of International PCT Application PCT/FR2009/051054, filed Jun. 4, 2009.

FIELD OF THE INVENTION

The present invention relates to a process and an installation for producing a synthesis gas by catalytic steam reforming of a charge of hydrocarbons.

BACKGROUND

The hydrocarbon steam reforming process, commonly known as SMR ("steam methane reforming"), employs a reforming reaction which produces hydrogen and carbon monoxide from hydrocarbons and steam. This reaction entails a significant influx of heat because of its highly endothermic nature. To this end, the hydrocarbons and the steam are introduced into catalyst-filled reforming tubes, said tubes being placed in a furnace. The mixture obtained at the outlet of the tubes is predominantly made up of $H_2$ and CO, known as synthesis gas or syngas.

The furnace is made up of one or more combustion chambers made of refractory walls and of burners placed on these walls. The burners are arranged in such a way as to transfer the heat of their combustion to the mixture of hydrocarbons and of steam through the wall of the tubes, generally by radiating the heat of the flame onto the refractory walls of the combustion chamber. The present invention relates to furnaces in which the burners are positioned on two of the vertical walls of the combustion chamber, said walls, known also as side walls, being opposing walls facing one another. This type of furnace is heated from the side (side-fired) and differs from furnaces in which the burners are mounted in the roof of the furnace (known as top-fired furnaces).

In side-fired furnaces, in each combustion chamber, the reforming tubes are arranged in a line in a plane situated equidistant between the two vertical side walls that support the burners. The combustion gases, also known as flue gases, are discharged from the seat of combustion in the top part of the furnace (the top part or top region of the furnace means that region of the furnace that is situated above the highest row of burners). The outlets, at the furnace end, of the flue gas discharge pipes are located at the top end of the furnace on just one of the side walls. There may be a number of flue gas discharge pipes in one and the same furnace but these pipes are always positioned on one and the same vertical side wall, at the same height in the furnace, and are uniformly spaced apart.

It has been noticed that arranging the flue gas discharge pipes asymmetrically in the furnace in relation to the row of tubes causes preferential aspiration of the combustion gases in that half of the furnace that is situated on the same side as the outlets of said pipes (we shall also call this the $1^{st}$ half of the furnace); this preferential aspiration leads to asymmetry in the flow of combustion gases and leads to a loss of thermal efficiency of the furnace.

What specifically happens is that it leads to significant asymmetry in the range of temperatures of the combustion gases on each side of the row of tubes which results from the hot gases passing preferentially toward the outlet in said $1^{st}$ half of the furnace (situated on the outlet side). In the $2^{nd}$ half of the furnace, the combustion gases suffer a pressure drop which can be attributed to their need to pass across the row of reforming tubes in order to reach the outlet. Because the obstacle that the row of tubes represents considerably slows the passage of the combustion gases, these gases begin to recirculate in the top end of this $2^{nd}$ half of the furnace. The residence time of the combustion gases as they cross the top region of the furnace is therefore shorter in the $1^{st}$ half than in the $2^{nd}$ half.

However, the combustion gases with the shorter residence time transfer less energy by radiation to the row of forming tubes and exit into the outlet pipes at a hotter temperature. The thermal energy discharged as a result of a higher flue gas temperature thus represents a synthesis gas production potential that is not realized.

SUMMARY OF THE INVENTION

It is an object of the present invention to propose a reforming process in a side-fired furnace that makes it possible to improve the heat transfer in the top part of the furnace in order to increase the production capability thereof.

This improvement is obtained according to the solution of the invention by making the flow of the gases (or flue gases) in the top part of the furnace more symmetric.

The invention thus relates to a process for producing a synthesis gas from a charge of hydrocarbons comprising at least one step of generating a raw synthesis gas by catalytic steam reforming of said charge of hydrocarbons with the heat necessary for the reforming being produced by combustion, said step being performed in a reforming furnace comprising:
  at least one combustion chamber having at least two opposing vertical refractory walls 1, 2,
  at least one row of reforming tubes 3 vertically aligned mid-way between the two opposing vertical refractory walls, filled with reforming catalyst, and able to circulate, from the top down, a mixture containing the charge of hydrocarbons and steam, so that the raw synthesis gas can be recovered at the bottom of the tubes,
  burners 4 positioned on each of the two opposing vertical refractory walls 1, 2, said burners being supplied with fuel and with oxidant and able by combustion to produce radial flames parallel to the surface of the wall,
  at least one discharge pipe outlet for discharging the gases resulting from said combustion, which is situated at the top end of the furnace on just one of the vertical walls 1,
  said generating step producing, in addition to the raw synthesis gas, combustion gases emitted during the combustion and which flow toward at least one combustion gas outlet pipe; the process is characterized in that at least one gas discharge pipe has a deflector installed at the outlet at the junction between the pipe and the wall 1 to oppose the flow of said combustion gases toward said outlet so as to limit their preferred aspiration into that half of the furnace that is situated on the same side as said at least one gas discharge pipe.

The pipe/outlet/deflector assembly thus formed is designed and sized so that the flows of combustion gas are as symmetric as possible on each side of the row of reforming tubes.

The invention makes it possible to even out the distribution of temperature on each side of the row of reforming tubes and ensure greater transfer of heat energy to the reforming tubes.

The invention also makes it possible to improve the raw synthesis gas production capability of a furnace.

According to a preferred implementation of the invention, the deflector consists of a set of plates extending all or part of the existing walls of the gas (flue gas) discharge pipe toward the row of tubes.

The invention can be incorporated into the design of new synthesis gas production units.

The invention can also be used to improve the performance of existing steam reforming furnaces of comparable geometry.

The invention thus relates to a process intended to improve the performance of an existing steam reforming furnace, comprising:
- at least one combustion chamber having at least two opposing vertical refractory walls 1, 2,
- at least one row of reforming tubes 3 vertically aligned mid-way between the two opposing vertical refractory walls, filled with reforming catalyst, and able to circulate, generally from the top down, a mixture containing the charge of hydrocarbons and steam, so that the raw synthesis gas can be recovered at the bottom of the tubes,
- burners 4 positioned on each of the two opposing vertical refractory walls 1, 2, said burners being supplied with fuel and with oxidant and able by combustion to produce radial flames parallel to the surface of the wall,
- at least one discharge pipe outlet for discharging the gases resulting from said combustion, which is situated at the top end of the furnace on just one of the vertical walls 1, characterized in that the combustion gas discharge pipe is equipped with a deflector that extends said pipe into the combustion chamber of the furnace, toward the row of reforming tubes.

A preferred deflector for improving the performance of a furnace consists of a set of plates extending all or part of the walls of the combustion gas discharge pipe into the furnace, toward the row of tubes.

The invention also relates to an installation for producing synthesis gas comprising a steam reforming furnace capable of implementing the process described hereinabove, which comprises at least one combustion chamber and at least one convection chamber, said combustion chamber having at least:
- two opposing vertical refractory walls,
- one row of reforming tubes vertically aligned mid-way between the two opposing vertical refractory walls, filled with reforming catalyst, and able to circulate, generally from the top down, a mixture containing the charge of hydrocarbons and steam, so that the raw synthesis gas can be recovered at the bottom of the tubes,
- burners positioned on each of the two opposing vertical refractory walls, said burners being supplied with fuel and with oxidant and able by combustion to produce radial flames parallel to the surface of the wall,
- at least one outlet able to receive a discharge pipe for discharging the gases resulting from said combustion, which is situated at the top end of the furnace on just one of the vertical walls, said convection chamber containing at least said combustion gas discharge pipe, characterized in that the gas discharge pipe has a deflector installed at the outlet at the junction between the pipe and the wall to oppose the flow of said combustion gases toward said outlet so as to limit their preferred aspiration into that half of the furnace that is situated on the same side as said gas discharge pipe. The preferred deflector consists of a set of plates as described hereinabove.

Another aspect of the invention relates to a hydrocarbon steam reforming furnace that has been improved by installing a deflector according to the process described hereinabove; a preferred deflector consisting of a set of plates extending all or part of the existing walls of the combustion gas discharge pipe into the furnace, toward the row of tubes.

DETAILED DESCRIPTION OF THE INVENTION

Figure 1:
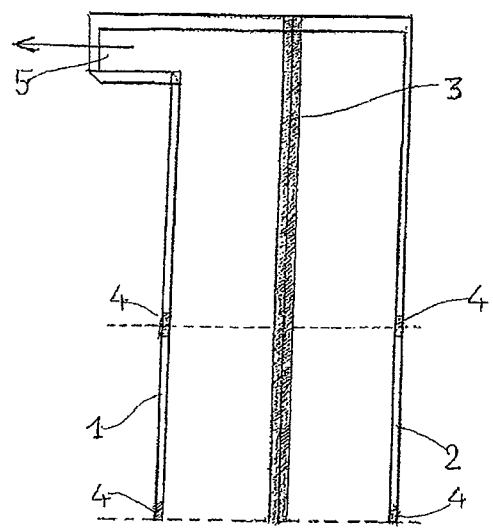
FIG. 1 illustrates a conventional furnace, in its top part.
Figure 2:
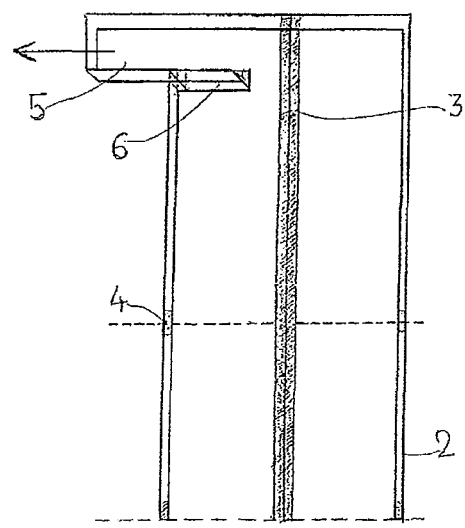
FIG. 2 illustrates a furnace according to the invention, in its top part.

For a further understanding of the nature and objects for the present invention, reference should be made to the detailed description, taken in conjunction with the accompanying drawing, in which like elements are given the same or analogous reference numbers and wherein:

The simulation is based on a steam reforming furnace according to FIG. 1 or FIG. 2 comprising 60 tubes heated by 108 burners.

FIG. 1 gives a schematic view of a side-fired reforming furnace of standard design showing the respective positions of various constituent parts of said furnace, of benefit in understanding the invention. Only the top part of the furnace is depicted here. The figure shows a reforming tube 3 (in actual fact this would be a row of tubes); the tubes 3 are situated mid-way between two refractory walls 1 and 2. The refractory walls 1 and 2 are provided with burners 4 arranged in the form of rows and columns. The combustion gases are discharged from the combustion chamber in the top part of the furnace. The outlet to the flue gas discharge pipe 5 is located at the top end of the furnace on the side wall 1. It opens directly into the wall. There may be several flue gas discharge pipes in one and the same furnace, but the outlets are always positioned on the same side wall, at the same height in the furnace, and are uniformly spaced apart.

FIG. 2 gives a schematic view of a side-fired reforming furnace according to the invention. This furnace differs from that of FIG. 1 in that the outlet of the flue gas discharge pipe 5 is equipped with a device that makes the flows on each side of the row of reforming tubes 3 symmetric; said device in this example consists of a set of plates 6 which have been added in comparison with the example of FIG. 1 so as to extend the pipe inside the seat of combustion toward the row of reforming tubes 3.

The examples give the results of the numerical simulation carried out in order to characterize the flow of the combustion gases and the heat transfer in a reforming furnace of standard design according to FIG. 1 (case 1, comparative example) and in a modified reforming furnace according to the invention (case 2, example according to the invention).

Both cases were run under the same operating conditions (rates at which fuel and air were injected at the burners, methane and steam flow rates through the reforming tubes, heat losses, etc.). Case 2 differs from case 1 solely through the addition of the plates extending the flue gas outlet pipe according to the device of FIG. 2 in accordance with the invention.

Figure 3:
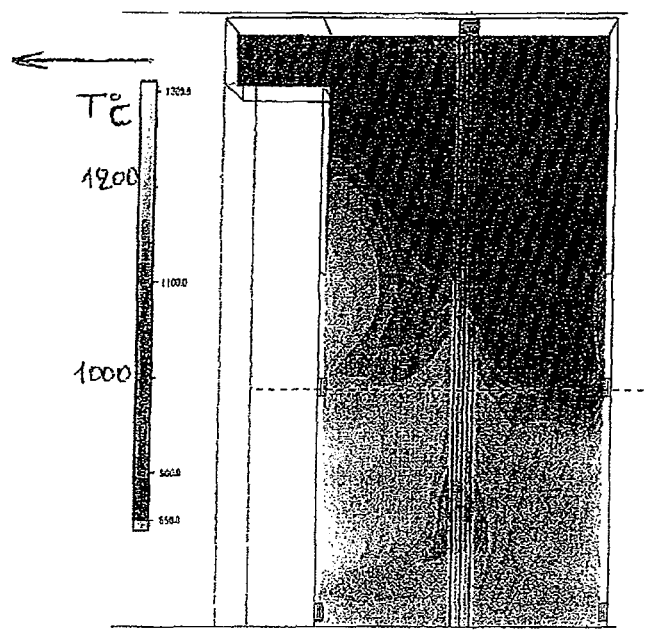
FIG. 3 shows the range of temperatures in the top part of a conventional furnace according to FIG. 1.

FIG. 3 shows the range of temperatures obtained by calculation in the top part of the conventional furnace of FIG. 1; only the top part of the furnace is depicted. This figure reveals a significant asymmetry in the range of burnt gas temperatures on each side of the row of tubes. Said asymmetry illustrates the preferential passage of the hot gases (at a temperature of the order of 1000° C.) toward the combustion gas outlet in the first half of the furnace. In the $2^{nd}$ half of the furnace, the row of tubes significantly slows the passage of the combustion gases and it is found that these gases are re-circulated in the top end of this half of the furnace.

Figure 4:
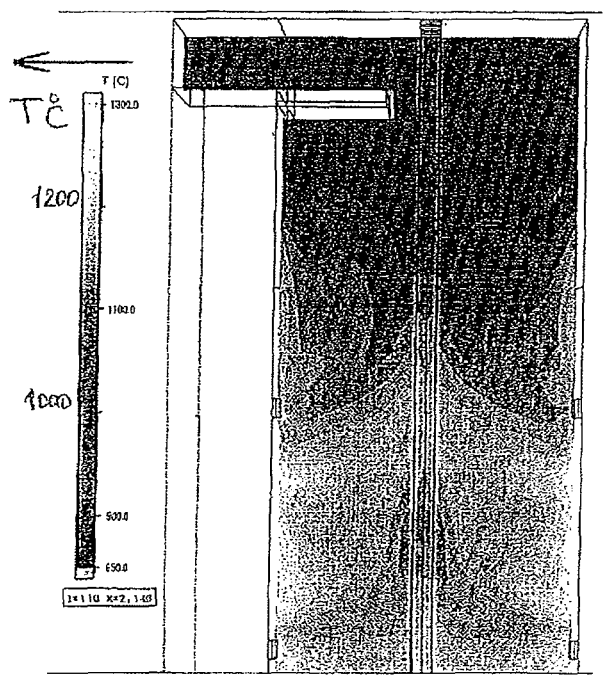
FIG. 4 shows the range of temperatures in the top part of a modified furnace according to the invention, in accordance with FIG. 2.

FIG. 4 shows the range of temperatures obtained by calculation for the modified furnace according to the invention according to FIG. 2. A more symmetric temperature distribution with respect to the row of reforming tubes may be observed.

The comparative results are collated in Table 1 which gives the improvements in performance in a percentage, in relation to the conventional case.

TABLE 1

|  | Case 1: example without deflector (comparative) | Case 2: example with deflector (according to the invention) |
|---|---|---|
| Power transferred to the reforming tubes | 100 | 101.8 |
| Production of H$_2$ | 100 | 101.6 |
| Production of CO | 100 | 102.8 |

Here it can be seen that the thermal efficiency of the furnace is improved by 1.8% and that the flow rates of hydrogen and carbon monoxide produced are improved by 1.6% and 2.8% respectively. The furnace therefore has better overall efficiency and improved production capability.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for producing a synthesis gas from a charge of hydrocarbons comprising at least one step of generating a raw synthesis gas by catalytic steam reforming of said charge of hydrocarbons with the heat necessary for the reforming being produced by combustion, said step being performed in a reforming furnace comprising:
   at least one combustion chamber having at least two opposing vertical refractory walls;
   at least one row of reforming tubes vertically aligned midway between the two opposing vertical refractory walls, filled with reforming catalyst, and able to circulate, from the top down, a mixture containing the charge of hydrocarbons and steam, so that the raw synthesis gas can be recovered at the bottom of the tubes;
   burners positioned on each of the two opposing vertical refractory walls, said burners being supplied with fuel and with oxidant and able by combustion to produce radial flames parallel to the surface of the wall;
   at least one combustion gas discharge pipe outlet for discharging the gases resulting from said combustion, the combustion gas discharge pipe outlet is situated at the top end of the furnace on just one of the vertical refractory walls,
   said generating step producing, in addition to the raw synthesis gas, combustion gases emitted during the combustion and which flow toward the at least one combustion gas discharge pipe outlet,
   wherein the at least one combustion gas discharge pipe outlet has a deflector installed at the junction between the combustion gas discharge pipe outlet and the vertical refractory wall, wherein the deflector is configured to oppose the flow of said combustion gases toward said outlet such that the flows of combustion gas are substantially symmetrical on each side of the row of reforming tubes.

2. The process of claim 1, wherein the deflector consists of a set of plates extending toward the row of tubes.

3. The process of claim 1, wherein the deflector is in contact with only one of the two opposing vertical refractory walls.

4. The process of claim 1, wherein the deflector does not extend the entire width of the combustion chamber.

5. The process of claim 1, wherein the deflector extends from one of the two refractory walls and is not in contact with the reforming tubes.

6. The process of claim 1, wherein the deflector extends substantially horizontally from one of the two refractory walls and does not extend past the reforming tubes.

7. The process of claim 1, wherein the combustion gas discharge pipe outlet is substantially perpendicular to the wall.

8. The process of claim 1, wherein the deflector is asymmetric about the vertical cross section of the reforming furnace.

9. A process to improve the performance of an existing steam reforming furnace, comprising:
   at least one combustion chamber having at least two opposing vertical refractory walls;
   at least one row of reforming tubes vertically aligned midway between the two opposing vertical refractory walls, filled with reforming catalyst, and able to circulate, generally from the top down, a mixture containing a charge of hydrocarbons and steam, so that a raw synthesis gas can be recovered at the bottom of the tubes;
   burners positioned on each of the two opposing vertical refractory walls, said burners being supplied with fuel and with oxidant and able by combustion to produce radial flames parallel to the surface of the wall;
   at least one combustion gas discharge pipe outlet for discharging the gases resulting from said combustion, the combustion gas discharge pipe outlet is situated at the top end of the furnace on just one of the vertical refractory walls,
   providing the combustion gas discharge pipe outlet with a deflector that extends said combustion gas discharge pipe into the combustion chamber of the furnace, toward the row of reforming tubes, flowing the combustion gas such that the combustion gas flows are substantially symmetrical on each side of the row of reforming tubes.

10. The process of claim 9, wherein the deflector consists of a set of plates extending into the furnace, toward the row of tubes.

11. A hydrocarbon steam reforming furnace that has been improved by installing a deflector according to the process of claim 9.

12. The improved reforming furnace as claimed in claim 11, in which the deflector consists of a set of plates extending all or part of the existing walls of the combustion gas discharge pipe into the furnace, toward the row of tubes.

13. An installation for producing synthesis gas comprising a steam reforming furnace capable of implementing the process of claim 1, comprising at least one combustion chamber and at least one convection chamber, said combustion chamber having at least:

two opposing vertical refractory walls,
one row of reforming tubes vertically aligned mid-way between the two opposing vertical refractory walls, filled with reforming catalyst, and able to circulate, generally from the top down, a mixture containing the charge of hydrocarbons and steam, so that the raw synthesis gas can be recovered at the bottom of the tubes,
burners positioned on each of the two opposing vertical refractory walls, said burners being supplied with fuel and with oxidant and able by combustion to produce radial flames parallel to the surface of the wall,
at least one outlet able to receive a discharge pipe for discharging the gases resulting from said combustion, which is situated at the top end of the furnace on just one of the vertical walls, said convection chamber containing at least said combustion gas discharge pipe,
wherein the gas discharge pipe has a deflector installed at the outlet at the junction between the pipe and the wall to oppose the flow of said combustion gases toward said outlet so as to limit their preferred aspiration into that half of the furnace that is situated on the same side as said at least one gas discharge pipe, such that the flows of said combustion gases are substantially symmetrical on each side of the row of reforming tubes.

14. The installation of claim 13, in which the deflector consists of a set of plates extending all or part of the existing walls of the combustion gas discharge pipe toward the row of tubes.

\* \* \* \* \*